United States Patent
Coffey

(10) Patent No.: US 7,301,853 B2
(45) Date of Patent: Nov. 27, 2007

(54) TUBULAR MEASURING DEVICE

(76) Inventor: David B. Coffey, R.R. 1, Comp. 3A, Dauphin, R7N2T4 (CA)

( * ) Notice: Subject to any disclaimer, the term of this patent is extended or adjusted under 35 U.S.C. 154(b) by 66 days.

(21) Appl. No.: 11/163,914

(22) Filed: Nov. 3, 2005

(65) Prior Publication Data

US 2007/0097789 A1 May 3, 2007

(51) Int. Cl.
  *G01S 15/00* (2006.01)
(52) U.S. Cl. ........................................... 367/99
(58) Field of Classification Search ................... 367/99, 367/151
  See application file for complete search history.

(56) References Cited

U.S. PATENT DOCUMENTS 4,930,350 A * 6/1990 Bode et al. ................. 367/902

2007/0097789 A1 * 5/2007 Coffey ........................ 367/99

OTHER PUBLICATIONS

Leica Disto Lite, Web page catalog, [Accessed] Oct. 7, 2005, 2 pages, Instrument Sales, Redford, USA.

* cited by examiner

*Primary Examiner*—Daniel Pihulic
(74) *Attorney, Agent, or Firm*—Law Office of Marc D. Machtinger, Ltd.

(57) ABSTRACT

A tubular measuring device, comprising an electronic distance measuring device, a first tubular end locator attached to the electronic distance measuring device, a target for the electronic distance measuring device; and a second tubular end locator attached to the target. The locators may be rods with hooks on them for catching opposed ends of the tubular. The tubular measuring device may also comprise calipers attached to the electronic distance measuring device for measuring internal and external dimensions of tubulars.

16 Claims, 4 Drawing Sheets

TUBULAR MEASURING DEVICE

BACKGROUND OF THE INVENTION

The current method of measuring the depth of penetration of a drilling tool into the ground during well drilling is to measure the length of each drill pipe in the drill string. As well the depth at which casing is placed and cemented in the ground is deduced by measuring each individual casing joint. The various tubulars in a string will have variable lengths, which means that a simple count of the tubulars will not work to determine the total length. Each tubular must be measured. Normally, this is done by using a tape measure. One rig hand holds one end of the tape measure at the box end of the tubular or casing joint, while the other rig hand holds the other end of the tape measure at the pin end of the tubular. The rig hands then read off the measurement and write it down. This data is then physically entered into a computer system. This method is archaic and prone to errors.

SUMMARY OF THE INVENTION

The inventor proposes a more accurate device and method for measuring drill tool/well casing length.

There is therefore provided according to an aspect of the invention, a tubular measuring device, comprising an electronic distance measuring device, a first tubular end locator attached to the electronic distance measuring device, a target for the electronic distance measuring device; and a second tubular end locator attached to the target. The locators may be rods with hooks on them for catching opposed ends of the tubular. The tubular measuring device may also comprise calipers attached to the electronic distance measuring device for measuring internal and external dimensions of drill tools or casing joints.

There is also provided a method of measuring a length of a tubular by attaching an electronic distance measuring device to one of the box end and pin end of a tubular, attaching a target to the other of the box end and pin end of the tubular; pointing the electronic distance measuring device at the target; and measuring, and preferably also recording, the length of the tubular with the electronic distance measuring device. The method is typically carried out on successive drill pipe lengths or casing joints, and is carried out on the drill floor or on the pipe racks at the drilling rig.

These and other aspects of the invention are set out in the claims, which are incorporated here by reference.

BRIEF DESCRIPTION OF THE FIGURES

Preferred embodiments of the invention will now be described with reference to the figures, in which like reference characters denote like elements, by way of example, and in which.

DETAILED DESCRIPTION OF THE PREFERRED EMBODIMENTS

Figure 1:
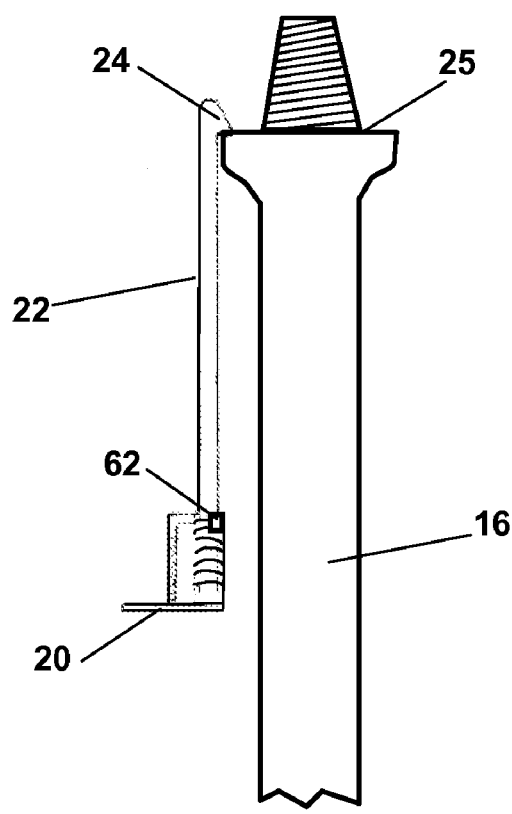
FIG. 1 shows an exemplary tubular measuring tool according to the invention showing pin end and box end of the same tubular.
Figure 1:
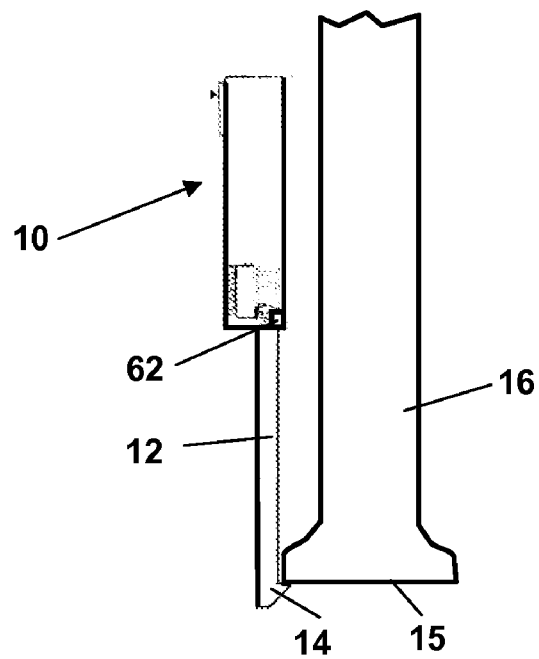
Figure 1A:
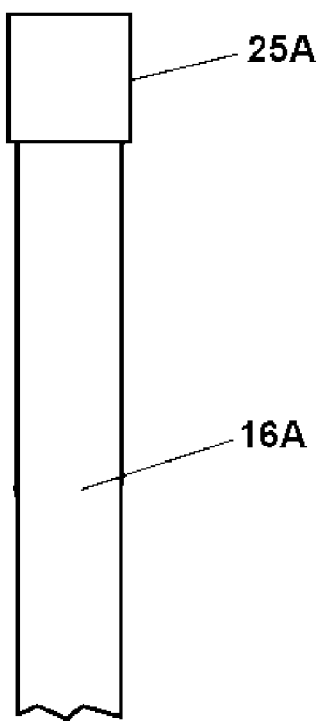
FIG. 1A shows an exemplary casing with which the tubular measuring tool may be used.
Figure 1A:
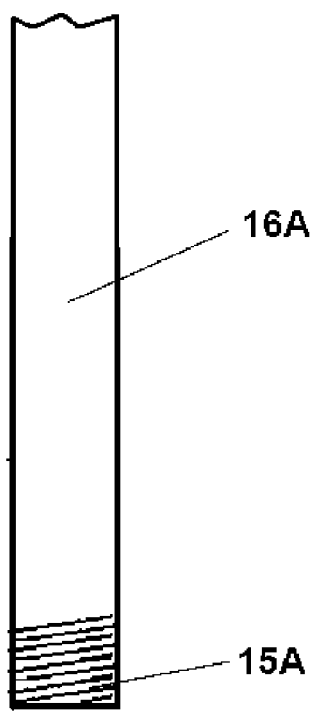

In the claims, the word "comprising" is used in its inclusive sense and does not exclude other elements being present. The indefinite article "a" before a claim feature does not exclude more than one of the features being present. A tubular measuring device shown in FIG. 1 has two parts. An electronic distance measuring device 10 is attached to one end of an extension rod 12 by any suitable means. At the other end of the rod 12 is a hook 14 for attaching over the pin end 15 of a tubular 16. At the other end of the tubular 16, a target 20 is attached to one end of an extension rod 22 by any suitable means. The target 20 may be a flat plate. At the other end of the rod 22 is a hook 24 for attaching over the box end 25 of a tubular 16. The hooks 14, 24 function as tubular end locators ie the hooks 14, 24 locate respective measuring points on the tubular. The tubular end locators may have other forms. It is desirable that the tubular end locators catch some part of the tubular so that they can be held at the intended location during the measurement process. Hooks 14, 24 provide adequate catches for a tubular 16. The distance between the upwardly facing shoulder on the upset of the box end 25 and the downwardly facing shoulder on the pin end 15 equals the incremental length to a drill string or drilled hole that is provided by the tubular 16. Thus, measuring successive tubulars 16 as they are added to a drill string provides an indication of the length of drill string in the hole. As shown in FIG. 1A, the distance between the end of the box end collar 25A and beginning of the threads on the pin end 15A of each casing joint equals the incremental length to a cased hole that is provided by the casing 16A. Thus, measuring successive casing 16A as they are added to a cased hole provides an indication of the length of casing in the hole. For measuring casing and locating the measuring points on casing 16A, the hook 24 is attached over the upper shoulder of the box end collar 25A, and the hook 12 is placed against the tubular with the edge of the hook 12 adjacent the beginning of the threads on the pin end 15A.

The rods 12, 22 should have a convenient length such as no more than 60 cm for the rod 12 and at least 1 meter for the rod 22. The rods 12, 22 have more than one function. First, the rods 12, 22 attach the respective device, electronic distance measuring device 10 and target 20 to the hooks 14, 24. Second, the rods 12, 22 are preferably sufficiently long enough that an eyeball estimate can establish that they are more or less parallel to the drill pipe/casing 16, 16A. This causes the electronic distance measuring device 10 and the target 20 to be located in consistent locations in relation to the tubular ends. If the rods 12, 22 deviate from being parallel to the drill pipe 16, an error in length measurement is likely to be introduced, with the error increasing with increasing deviation. Third, the rods 12, 22 allow convenient access for a rig hand to the measuring points. Thus, the rod 12 allows a rig hand standing on the drill floor to hold the electronic distance measuring device 10 in his hand while attaching the rod 12 to the pin end 15 of the drill pipe 16. The rod 22 allows a rig hand standing in the mast to reach up and attach the target 20 to the upset of the box end 25 without having to climb all the way to the top of the drill pipe 16, which might be 10' from where the rig hand stands on the monkey boards in the derrick.

An electronic distance measuring device is any electronic device able to measure a distance between the device and a remote object by use of sound or electromagnetic waves. Devices that use sound to measure distance may also include a laser pointer to identify the target for the sound waves. Examples of electronic distance measuring devices are the EDMDT of Tri-Tech Inc. of Southport, N.C. or the Sonin (tm) distance measuring device or Leica Disto (tm) distance measuring devices. For rig use in a variety of conditions, the electronic distance measuring device 10 should have a temperature operation range from −50 C. to +40 C., and should have a casing for protecting the device 10 against shock and weather conditions. Accuracy of plus or minus 3 mm is recommended for the device 10. The size of the target 20 depends on the beam spread of the sound or radiation emitted by the electronic distance measuring device 10. For laser distance measuring devices, the size should be somewhat more than the spot size of the laser, to enable the operator to place the laser beam on the target 20. For sonar distance measuring devices, the size should be sufficient to reflect enough sound back to the electronic distance measuring device 10 for the device 10 to function. It is preferred that the target not be any larger then 15 cm by 15 cm as the beam or wave will pass between the fingers in the derrick which are no more then 15 cm apart.

Figure 2A:
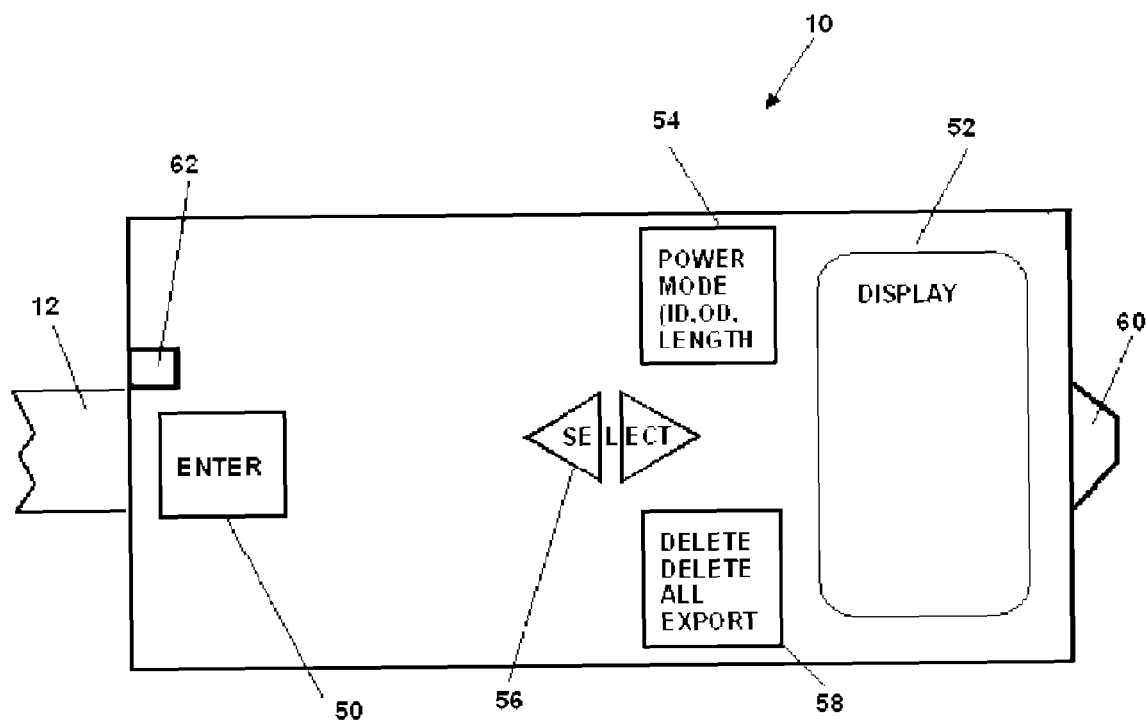
FIG. 2A shows an embodiment of an electronic distance measuring device for use in the embodiment of FIG. 1.
Figure 2B:
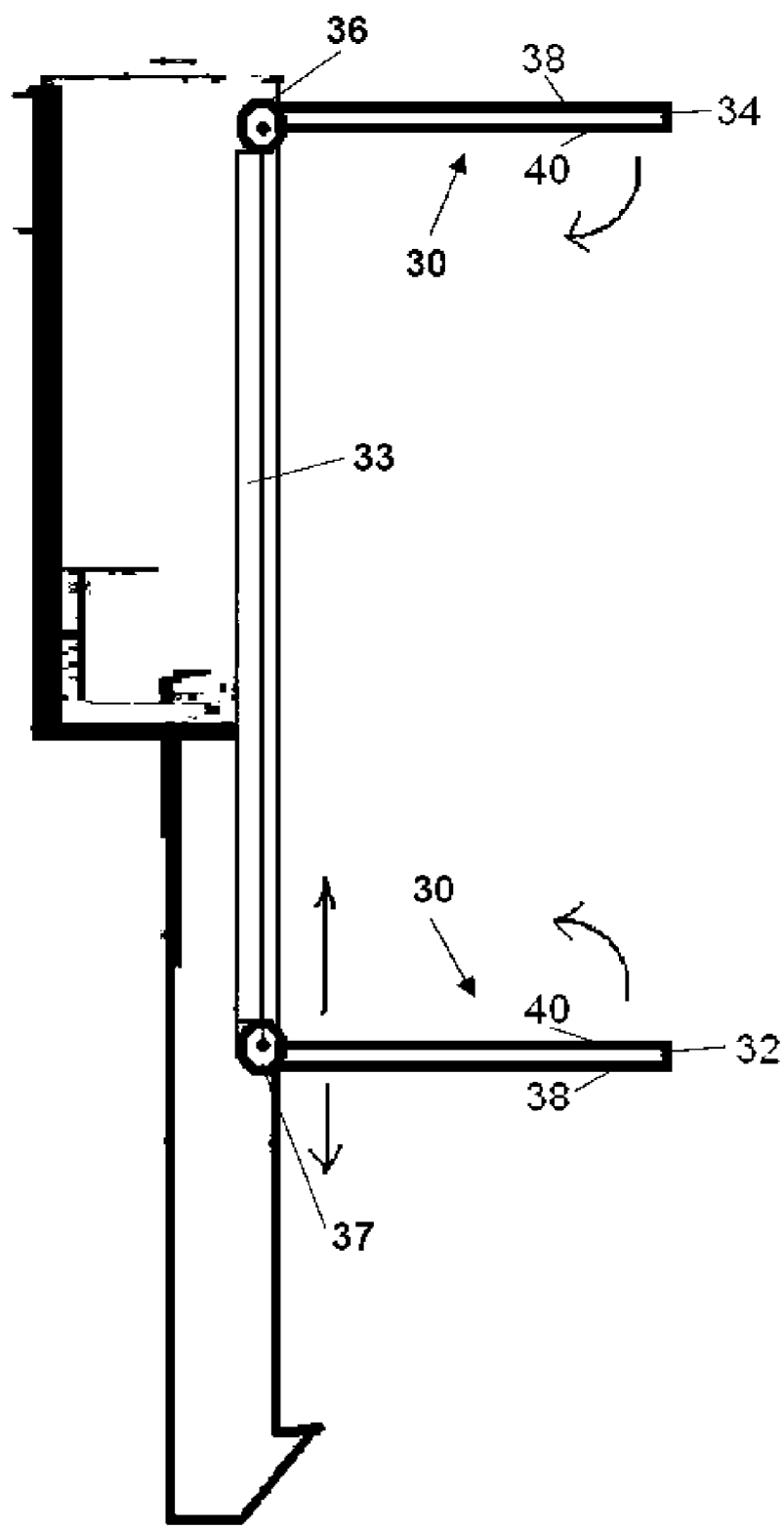
FIG. 2B shows calipers on the electronic distance measuring device of FIG. 1.

As shown in FIG. 2B, calipers 30 may be attached to the electronic distance measuring device 10 for measuring internal dimensions (ID) and outer dimensions (OD) of tubulars. The calipers 30 have a pair of arms 32, 34. Both arms 32, 34 should be pivotally connected to the electronic distance measuring device 10 on pivots 36, 37. As shown in FIG. 2B, both arms 32, 34 are rotatably mounted to the pivot 36, 37 as to collapse into the device. Arm 34 remains stationary through out the operation of attaining an ID or OD. As shown in FIG. 2B, arm 32 slides on a rule 33 which is arranged inside a slot extending away from arm 34 and on the back of the device 10. The sliding of arm 32 on the rule 33 is translated by any suitable means into electrical signals indicative of distance between the edges 38 for ID measurement and between the edges 40 for OD measurement. Arms 32, 34 pivot inside the slot on the device 10 for ease of storage but should be moved to be perpendicular to the device 10 during OD/ID measurement. The calipers 30 may have a measuring range of 4 cm to 30 cm for ID, and 0 cm to 34 cm for OD.

The electronic distance measuring device 10 should function as a recorder and include a memory for storing tubular measurements, although it is possible to operate the device 10 with manual recordation of the tubular pipe lengths. Preferably, the memory will include sub-memories corresponding to different tubulars. The memory should contain a sufficient number of measurements, such as 350. The buttons on the electronic distance measuring device 10 should be large and easy to use, for example by a person with gloves on. For example, it is desirable that the enter button 50 be pressed by an operator's thumb. A data port such as a USB port may also be used to convey data from the device 10 to another device such as a computer. The electronic distance measuring device 10 should also include a display 52 which should display mode, item, previously recorded length, length, total length and battery life.

In use, the electronic distance measuring device 10 of a tubular measuring device is attached to the pin end 15 of a tubular 16, such as a drill pipe that is standing on the drill floor of a drilling rig, and the target 20 of the tubular measuring device is attached to the box end 25 of the tubular 16. Possibly, the device 10 could be attached to the box end 25, and the target 20 to the pin end 15, but this means that the measuring will take place high in the rig, which would be inconvenient. The rig hands using the device should ensure that the rods 12, 22 are parallel to the drill pipe 16, and the hooks 14, 24 are hooked respectively onto the pin end 15 and box end 25. The electronic distance measuring device 10 is then pointed at the target 20. If the electronic distance measuring device 10 operates with a laser beam or has a laser pointer, the correct location of the electronic distance measuring device 10 can easily be verified by location of the laser beam on the target 20. A recording can then be made with the electronic distance measuring device 10. Preferably, the recorded measurement of the length of the tubular is saved in a memory in the electronic distance measuring device.

It is desirable to have a number of features programmed into the electronic distance measuring device 10. For example, the electronic distance measuring device 10 should display the measurement after both the target and the device 10 are simultaneously stationary for a period of two seconds at which time the device 10 should emit a sound and the display will flash the measurement. If the target 20 is equipped with electronics, then the target 20 may also issue a confirmatory sound when a measurement is stored so the rig hand with the target can move to the next joint to be measured. The enter button 50 is pressed to record the measurement. A power button 54 is held down for 3 seconds to turn the device 10 on and off. Once the device 10 is on, the power button 54 may be pressed to select the type of measurement, for example pressed once to select ID, once more to select OD, and once more to select length. A select button 56 may then be pressed to select the tubular item to be measured, for example stands, drill pipe (dp), drill collar (dc), casing (cas), marker joint (m-joint), bit sub, cross-over (xo), near bit stabilizer (nbs), stabilizer (stab), jars, shock sub or mud motor (mm). The enter button 50 is then used to record a measurement. A measurement may be deleted by pressing the delete button 58 followed by the enter button 50. All data may be deleted by pressing the delete button 58 twice followed by the enter button 50. The delete button 58 may be pressed three times followed by the enter button to export data when the device 10 is connected to another device through the USB port. These functions are easily programmable into the electronic distance measuring device 10. An exemplary sound or electromagnetic emitter 60 is shown on the device 10 in FIG. 2A.

Additional features that may be added to the device include pen lights 62 mounted on both the target and the recorder aimed at the hooks 14, 24. A program option or physical option may be provided to remove the extensions rods 12, 22 or to subtract the length of the extension rods 12, 22 from measurements to allow for measuring tubulars shorter then the length of the rods. Alternatively, the rods 12, 22 may be made telescoping. A communication option (simple "beep") may be provided with the target to alleviate communication barriers which arise from the distance between the rig hands during measuring. A back lit display and/or tilted display 52 may be provided to allow for ease of use and visibility when measuring tubulars at less accessible locations.

Measurements of the tubulars, drill tools and/or casing may be made on the drill floor, catwalk, pipe racks or other places at the lease location of the drill rig.

Immaterial modifications may be made to the embodiments of the invention described here without departing from the invention.

What is claimed is:

1. A tubular measuring device, comprising:
an electronic distance measuring device;
a first tubular end locator attached to the electronic distance measuring device, the first tubular end locator comprising a first rod having the electronic distance measuring device and a first tool end catch at opposed ends of the first rod;
a target for the electronic distance measuring device; and
a second tubular end locator attached to the target.

2. The tubular measuring device of claim 1 in which the second tubular end locator comprises a second rod having the target and a second tool end catch at opposed ends of the second rod.

3. The tubular measuring device of claim 2 in which the first tool end catch comprises a first hook and the second tool end catch comprises a second hook.

4. The tubular measuring device of claim 1 in which:
the electronic distance measuring device is a sonar device; and
the target comprises a flat plate.

5. A tubular measuring device, comprising:
an electronic distance measuring device;
a first tubular end locator attached to the electronic distance measuring device;
a target for the electronic distance measuring device;
a second tubular end locator attached to the target; and
calipers attached to the electronic distance measuring device for measuring internal or external dimensions of tubulars.

6. The tubular measuring device of claim 1 in which the electronic distance measuring device comprises a memory for storing tubular measurements.

7. The tubular measuring device of claim 6 in which the memory comprises sub-memories corresponding to different tubulars.

8. The tubular measuring device of claim 1 in which the electronic distance measuring device has an operation range from +40 C. to −50 C.

9. The tubular measuring device of claim 1 in which the electronic distance measuring device has a shock protective, water resistant and durable casing.

10. The tubular measuring device of claim 1 in which the electronic distance measuring device has a memory for storing distance measures.

11. A method of measuring a length of a tubular having a box end and pin end, the method comprising the steps of:
attaching an electronic distance measuring device to one of the box end and pin end of a tubular, the electronic distance measuring device being attached to a first rod;
attaching a target to the other of the box end and pin end of the tubular;
pointing the electronic distance measuring device at the target;
measuring the length of the tubular with the electronic distance measuring device; and
in which attaching the electronic distance measuring device to one of the box end and pin end of the tubular comprises hooking the first rod to the box end of the tubular.

12. The method of claim 11 further comprising the step of saving the length of the tubular in a memory in the electronic distance measuring device.

13. The method of claim 11 further comprising the step of recording the type of tubular in the memory of the electronic distance measuring device.

14. The method of claim 11 carried out on the drill floor or lease location of a drilling rig.

15. The method of claim 14 in which the tubular is a drill pipe or casing joint.

16. A method of measuring a length of a tubular having a box end and pin end, the method being carried out on the drill floor or lease location of a drilling rig and in which the tubular is a drill pipe or casing joint, the method comprising the steps of:
attaching an electronic distance measuring device to one of the box end and pin end of a tubular, the electronic distance measuring device being attached to a second rod;
attaching a target to the other of the box end and pin end of the tubular;
pointing the electronic distance measuring device at the target;
measuring the length of the tubular with the electronic distance measuring device; and
in which attaching the target to one of the box end and pin end of the tubular comprises hooking the second rod to the pin end of the tubular.

* * * * *